United States Patent Office 3,112,334
Patented Nov. 26, 1963

3,112,334
PROCESS FOR PREPARING DIETHYL OXALIMIDATE
John D. Behun, Southgate, Mich., assignor to Wyandotte Chemicals Corporation, Wyandotte, Mich., a corporation of Michigan
No Drawing. Filed June 16, 1960, Ser. No. 36,574
13 Claims. (Cl. 260—453)

This invention relates to a process for preparing diethyl oxalimidate of the formula $$C_2H_5-O-\overset{NH}{\underset{\|}{C}}-\overset{NH}{\underset{\|}{C}}-O-C_2H_5$$

Diethyl oxalimidate is a reactive chemical intermediate useful in the preparation of gasoline additives, agricultural chemicals, pharmaceuticals, chelating agents and polymers. Primary amines can be reacted with diethyl oxalimidate in accordance with the method disclosed in my copending U.S. patent application Serial No. 7,769, filed February 10, 1960, now U.S. Patent 3,018,289 in order to prepare oxamidines which are useful as metal deactivators in gasolines and other petroleum distillates wherein they deactivate the catalytic effect which copper and other metal compounds have on the oxidative deterioration of motor fuels when such fuels come in contact with air. See U.S. Patent No. 2,747,980, W. R. T. Gleim (May 29, 1956). Also, diethyl oxalimidate is effective as a nematocide in the agricultual art.

It has been suggested in the prior art, Nef, J.V., Annalen, 287, 205–359 (1895), that a mixture of ethyl cyanoformimidate and diethyl oxalimidate in 34% yield is obtained from the interaction of ethyl hypochlorite and potassium cyanide in an aqueous environment.

Accordingly, an object of this invention is to provide a process for preparing diethyl oxalimidate in substantially improved yields wherein economical raw materials are used.

Another object of this invention is to provide a process for preparing diethyl oxalimidate by interacting alkali metal cyanide, chlorine and ethanol in an aqueous alkaline environment.

A further object of this invention is to provide a process for preparing diethyl oxalimidate wherein the reaction is carried out in an aqueous alkaline environment maintained at a pH in the range of about 10.5 to 13.3.

In accordance with this invention, there is provided a process for preparing diethyl oxalimidate in substantially improved yields by interacting about two molar proportions of alkali metal cyanide, about one molar proportion of chlorine and about 5 to 21 molar proportions of ethanol in an aqueous alkaline environment, which comprises adding chlorine and an alkalizing agent selected from the group consisting of alkali metal hydroxides, alkali metal cyanides and mixtures thereof to an agitated aqueous solution of ethanol and an alkali metal cyanide maintained at a temperature in the range of about −25° to +5° C., the alkalizing agent being added in an amount sufficient to maintain the aqueous alkaline environment at a pH in the range of about 10.5 to 13.3 and continuing the agitation of the solution at a temperature in the range of about −15° to +10° C. until the alkali metal cyanide is substantially consumed and isolating therefrom diethyl oxalimidate.

The process is illustrated by the following equation:

$$2C_2H_5OH + 2NaCN + Cl_2 \xrightarrow[\substack{NaOH \\ -5°\,C.}]{H_2O} C_2H_5-O-\overset{NH}{\underset{\|}{C}}-\overset{NH}{\underset{\|}{C}}-O-C_2H_5 + 2NaCl$$

In practicing the method of the invention, water, ethanol and an alkali metal cyanide are added to a reactor equipped with a condenser, agitator, temperature recorder, heat exchanger and inlets for admitting an alkalizing agent and chlorine.

Although the above equation indicates that two molar proportions of ethanol will react with two molar proportions of sodium cyanide and one molar proportion of chlorine in an aqueous alkaline environment in order to obtain one molar proportion of diethyl oxalimidate, I have found that it is necessary to use excess ethanol in order to obtain high yields of diethyl oxalimidate. Thus, about 5 to 21 molar proportions and, preferably, about 8 to 16 molar proportions of ethanol are used per two molar proportions of alkali metal cyanide and one molar proportion of chlorine. The amount of water present is not particularly critical and the alcohol-water ratio, in parts by volume, is generally in the range of about 3:1 to 1:5 and preferably in the range of about 2:1 to 1:3. The alkali metal cyanides which are employed as reactants in order to prepare diethyl oxalimidate include, for example, sodium cyanide, potassium cyanide, lithium cyanide and the like, as well as mixtures thereof.

The aqueous solution of ethanol and alkali metal cyanide is cooled and maintained at a temperature in the range of about −25° to +5° C., an intermediate temperature being in the range of about −20° to −5° C., and preferred temperature being in the range of about −15° to −10° C.

The cooled solution is agitated and chlorine is admitted into the reactor at a flow rate of about 0.001 to 0.05 equivalent per minute based upon alkali metal cyanide and preferably at a flow rate in the range of about 0.005 to 0.02 equivalent per minute. The yield of diethyl oxalimidate is improved by carrying out the process at the preferred chlorine flow rate.

The alkalizing agents which are used in preparing diethyl oxalimidate include, for example, alkali metal hydroxides such as sodium hydroxide and potassium hydroxide, alkali metal cyanides such as sodium cyanide and potassium cyanide and mixtures thereof and are added to the reaction mixture prior to, simultaneously with or subsequent to the chlorine addition in an amount sufficient to maintain the aqueous mixture at a pH in the range of about 10.5 to 13.3 and, preferably, at a pH in the range of about 11.3 to 12.8. The alkalizing agent is added to the reaction mixture in either the anhydrous or solution form and is preferably added, as a solution, simultaneously with the chlorine addition. If the addition of the alkalizing agent is started after the chlorine flow has been commenced, it should be initiated prior to the time that 65% of the chlorine has been added in order to obtain the improved yields described herein.

After about one molar proportion of chlorine, based upon alkali metal cyanide, has been added to the reaction vessel, the reaction is continued under agitation at a temperature in the range of about −15° to +10° C. until the alkali metal cyanide is substantially consumed as determined by titrating samples of the reaction mixture with silver nitrate in accordance with the method set forth by Pierce and Haenish in their text entitled "Quantitative Analysis," 3rd ed., at p. 294, John Wiley & Sons, Inc., 1949. Although the reaction can be continued at a temperature in the range of −15° to +10° C., an intermediate temperature is from about −10° to +5° C., and a preferred temperature is from about −5° to 0° C.

Diethyl oxalimidate is readily isolated from the reaction mixture by extracting it therefrom with a suitable solvent such as diethyl ether. The diethyl ether is removed from the ether extract by distillation at atmospheric pressure and diethyl oxalimidate distills over at a temperature in the range of about 70° to 75° C. at a reduced pressure in the range of about 16 to 20 mm.

Although diethyl oxalimidate can be prepared in low yields by interacting ethanol, alkali metal cyanide and chlorine in approximately stoichiometric proportions in an aqueous environment, it has been discovered that the presence of excess ethanol and an alkalizing agent in an amount sufficient to maintain the pH of the reaction mixture in the range of about 10.5 to 13.3 will substantially improve the yield. Thus, as will be apparent from certain of the examples hereinafter set forth, when approximately stoichiometric amounts of chlorine, sodium cyanide and ethanol are reacted in an aqueous environment, there is obtained diethyl oxalimidate in 2.4% yield. However, when this reaction is carried out in the presence of excess ethanol and an alkalizing agent in an amount sufficient to maintain the pH of the reaction mixture at about 12, there is obtained diethyl oxalimidate in 73% yield.

The following examples further illustrate the method of the invention.

EXAMPLE I

This example illustrates the yield of diethyl oxalimidate obtained when stoichiometric amounts of ethanol and sodium cyanide and 93% of the stoichiometric amount of chlorine are reacted in an aqueous environment.

56.7 grams (1.1 mol) of sodium cyanide were dissolved in a mixture of 46 grams (1.0 mol) of absolute ethanol and 200 ml. of water contained in a three-neck round bottom flask equipped with a stirrer, thermometer, condenser and gas bubbler tube. The mixture was cooled to −15° C. with a Dry Ice-acetone bath and chlorine addition was begun with simultaneous stirring. Chlorine was added at the rate of 0.75 gram/minute, as measured by a calibrated U-tube water displacement flowmeter, for a period of 48 minutes. The temperature was maintained at −10° to +5° C. for an additional two hours with continued stirring. The mixture was extracted with diethyl ether and the ether extract was dried over anhydrous magnesium sulfate. The solvent was distilled off at atmospheric pressure and the residue was distilled at reduced pressure. There was obtained 1.7 grams (2.4%) of diethyl oxalimidate, B.P. 63° to 65° C. at 10 to 12 mm.

EXAMPLE II

This example illustrates the effect of excess ethanol on the yield of diethyl oxalimidate.

A 50.0 gram (1.0 mol) quantity of sodium cyanide was dissolved in a mixture of 200 ml. absolute ethanol and 400 ml. of water contained in a three-neck round bottom flask equipped with stirrer, condenser, thermometer and fritted-glass gas dispersion tube. The mixture was cooled to −15° C. and chlorine was added at the rate of 0.75 gram/minute for 48 minutes so that the stoichiometric quantity of chlorine was added. The temperature was maintained at −10° to −15° C. during the course of addition and then at 0° to −5° C. for an additional two hours with stirring. At the end of this time the reaction mixture was extracted with diethyl ether. The ether extract was dried over anhydrous magnesium sulfate, and then the solvent was distilled off at atmospheric pressure and the residue distilled under vacuum. From the distillation there was obtained 11.8 grams of forerun, B.P. 47° to 72° C. at 19 mm., and 26.2 grams of diethyl oxalimidate, B.P. 72° to 76° C. at 19 mm., along with 6.3 grams of residue. The forerun which contains a mixture of ethyl cyanoformimidate and diethyl oxalimidate was reworked to convert the ethyl cyanoformimidate to diethyl oxalimidate. The forerun was mixed with a solution of 5 grams of sodium cyanide in 15 ml. of ethanol and 15 ml. of water. Heat was evolved and the mixture became an opaque dark brown color upon standing at room temperature for one hour. At the end of this time the mixture was extracted with ether. The ether extract was dried over anhydrous magnesium sulfate, stripped of solvent and distilled at reduced pressure to give 10.2 grams of diethyl oxalimidate, B.P. 70° to 75° C. at 18 mm. The total weight of diethyl oxalimidate, 36.4 grams, represents a 50.5% theoretical yield based on either sodium cyanide or chlorine.

EXAMPLE III

This example illustrates the effect of an alkaline environment on the yield of diethyl oxalimidate wherein the alkalinity is provided by sodium hydroxide.

50 grams (1.0 mol) of sodium cyanide were dissolved in a mixture of 200 ml. of absolute ethanol and 400 ml. of water contained in a two-liter, three-neck flask equipped with a stirrer, thermometer, fritted-glass gas delivery tube and dropping funnel. The mixture was cooled to a −15° C. and chlorine was added at the rate of 0.75 gram/minute for 48 minutes so that the stoichiometric amount of chlorine was added. After eight minutes elapsed time, the addition of a solution of 2.5 grams of sodium hydroxide in 100 ml. of water was begun and was added at a rate so as to provide the aqueous environment with a pH between 11.9 and 12.3. During the simultaneous addition of chlorine and sodium hydroxide solution, the temperature was maintained at −15° to −10° C. Upon completion of the addition of chlorine and sodium hydroxide, the reaction mixture was maintained at a temperature from 0° to −5° C. for two hours with continuous stirring. The reaction mixture was worked up in accordance with the procedure set forth in Example I and there was obtained 52.2 grams (73% of the theoretical yield based upon NaCN) of diethyl oxalimidate, B.P. 65° to 72° C. at 12 to 16 mm.

Several runs are carried out in accordance with the procedure set forth in Example III except that the quantity of caustic soda in solution is varied from 1 gram per 200 ml. of water to 40.8 grams per 200 ml. of water and the effect of caustic soda concentration on the yield of diethyl oxalimidate is set forth in Table 1. The procedure, however, is distinguishable from Example III to the extent that in each run 100 grams of sodium cyanide were dissolved in a mixture of 400 ml. of absolute ethanol and 800 ml. of water and chlorine was added for 96 minutes.

*Table 1*

| NaOH (g./200 l.) | Average pH | Yield DEOI* percent of theoretical |
|---|---|---|
| 1.0 | 10.8 | 54.0 |
| 2.0 | 11.3 | 63.0 |
| 4.0 | 11.8 | 68.0 |
| 5.0 | 12.1 | 73.0 |
| 8.0 | 12.6 | 65.0 |
| 10.0 | 12.8 | 61.0 |
| 15.0 | 13.3 | 55.0 |
| 30.0 | 13.7 | 28.0 |
| 40.8 | 13.8 | 27.0 |

* Diethyl oxalimidate.

The yield set forth in Table 1 is the percent of theoretical yield based upon sodium cyanide.

EXAMPLE IV

This example illustrates the effect of an alkaline environment on the yield of diethyl oxalimidate wherein the alkalinity is provided by excess sodium cyanide.

50 grams (1.0 mol) of sodium cyanide were dissolved in a mixture of 200 ml. of absolute ethanol and 400 ml. of water contained in a three-neck round bottom flask equipped with a stirrer, condenser, thermometer and fritted-glass gas dispersion tube. The mixture was cooled to −15° C. and chlorine was added with stirring at the rate of 0.75 gram/minute for 23.8 minutes so that 51% of the stoichiometric quantity of chlorine, based upon sodium cyanide, was added. The temperature was maintained at −10° to −15° C. during the course of the chlorine addition and then at 0° to −5° C. for an additional two hours with stirring. The reaction mixture was maintained at a pH between 11.6 and 12.2. The reaction mixture was worked up in accordance with the procedure set forth in Example I and there was obtained 22.7 grams of diethyl oxalimidate, B.P. 73° to 77° C. at 16 to 18 mm. which represents 70% of the theoretical yield based upon chlorine.

Thus, the objects of this invention have been accomplished, namely, a process has been provided for preparing diethyl oxalimidate in substantially high yield by interacting ethanol, alkali metal cyanide and chlorine in an aqueous alkaline environment as is more particularly described herein.

I claim:
1. A process for preparing diethyl oxalimidate of the formula:

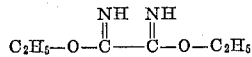

by interacting about two molar proportions of alkali metal cyanide selected from the group consisting of sodium cyanide, potassium cyanide and lithium cyanide, about one molar proportion of chlorine and about 5 to 21 molar proportions of ethanol in an aqueous alkaline environment, which comprises adding chlorine and an alkalizing agent selected from the group consisting of sodium hydroxide, potassium hydroxide, sodium cyanide, potassium cyanide and mixtures thereof to an agitated aqueous solution of ethanol and an alkali metal cyanide selected from the group consisting of sodium cyanide, potassium cyanide and lithium cyanide maintained at a temperature in the range of about −25° to +5° C., said alkalizing agent being added in an amount to maintain the aqueous alkaline environment at a pH in the range of about 10.5 to 13.3 and continuing the agitation of the solution at a temperature in the range of about −15° to +10° C. until the alkali metal cyanide is substantially consumed and isolating therefrom diethyl oxalimidate.

2. A process in accordance with claim 1 wherein chlorine is added to said solution at a rate of about 0.001 to 0.05 equivalent per minute based upon alkali metal cyanide.

3. A process in accordance with claim 1 wherein the pH is in the range of about 11.3 to 12.8.

4. A process in accordance with claim 1 wherein the ethanol/water ratio, in parts by volume, is from about 3:1 to 1:5.

5. A process in accordance with claim 1 wherein the temperature during the chlorine/alkalizing agent addition step is maintained in the range of about −20° to −5° C.

6. A process in accordance with claim 1 wherein said alkalizing agent is sodium hydroxide.

7. A process for preparing diethyl oxalimidate of the formula:

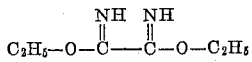

by interacting about two molar proportions of alkali metal cyanide selected from the group consisting of sodium cyanide, potassium cyanide and lithium cyanide, about one molar proportion of chlorine and about 5 to 21 molar proportions of ethanol in an aqueous alkaline environment, which comprises adding chlorine and an alkalizing agent selected from the group consisting of sodium hydroxide, potassium hydroxide, sodium cyanide, potassium cyanide and mixture thereof to an agitated aqueous solution of ethanol and alkali metal cyanide selected from the group consisting of sodium cyanide, potassium cyanide and lithium cyanide wherein the ethanol/water ratio, in parts by volume, is from about 3:1 to 1:5, said solution being maintained at a temperature in the range of about −25° to +5° C., said chlorine being added to said solution at a rate of about 0.001 to 0.05 equivalent per minute based upon alkali metal cyanide and said alkalizing agent being added in an amount sufficient to maintain the pH of the aqueous environment in the range of about 10.5 to 13.3 and continuing the agitation of the solution at a temperature in the range of about −10° to +5° C. until the alkali metal cyanide is substantially consumed and isolating therefrom diethyl oxalimidate.

8. A process in accordance with claim 7 wherein the alkali metal cyanide is sodium cyanide.

9. A process in accordance with claim 7 wherein the ethanol/water ratio, by volume, is from about 2:1 to 1:3.

10. A process in accordance with claim 7 wherein chlorine is added to said solution at a rate of about 0.005 to 0.02 equivalent per minute based upon alkali metal cyanide.

11. A process in accordance with claim 7 wherein the temperature of the solution during the chlorine/alkalizing agent addition step is maintained in the range of about −20° to −5° C.

12. A process in accordance with claim 7 wherein the alkalizing agent is sodium hydroxide.

13. A process in accordance with claim 7 wherein the molar proportions of ethanol are in the range of about 8 to 16.

References Cited in the file of this patent

FOREIGN PATENTS 868,908    Germany _____ Mar. 2, 1953

OTHER REFERENCES

Houben et al.: Ber. Deut. Chem., vol. 69, pages 2352–2360 (1936).

Nef: Ann. der Chem., vol. 287, pp. 205–359 (1895).